United States Patent
Kim et al.

(10) Patent No.: US 9,143,766 B2
(45) Date of Patent: Sep. 22, 2015

(54) METHOD AND APPARATUS FOR HIGH-SPEED CALIBRATION AND RECTIFICATION OF A STEREO CAMERA

(75) Inventors: Jung Gu Kim, Anyang-si (KR); Jae Hyung Yoo, Seoul (KR)

(73) Assignee: VISION ST CO., LTD., Seoul (KR)

( * ) Notice: Subject to any disclaimer, the term of this patent is extended or adjusted under 35 U.S.C. 154(b) by 348 days.

(21) Appl. No.: 13/382,257

(22) PCT Filed: Jun. 22, 2010

(86) PCT No.: PCT/KR2010/004024
§ 371 (c)(1),
(2), (4) Date: Jan. 4, 2012

(87) PCT Pub. No.: WO2011/004976
PCT Pub. Date: Jan. 13, 2011

(65) Prior Publication Data
US 2012/0105591 A1    May 3, 2012

(30) Foreign Application Priority Data
Jul. 6, 2009 (KR) ........................ 10-2009-0060939

(51) Int. Cl.
*H04N 13/02* (2006.01)
*H04N 13/04* (2006.01)
*H04N 17/00* (2006.01)

(52) U.S. Cl.
CPC ......... *H04N 13/0425* (2013.01); *H04N 17/002* (2013.01)

(58) Field of Classification Search
CPC ......... H04N 1/00; H04N 11/00; H04N 13/00; H04N 13/0435; H04N 5/00
See application file for complete search history.

(56) References Cited

U.S. PATENT DOCUMENTS 8,520,060 B2 * 8/2013 Zomet et al. .................... 348/51
2007/0165942 A1 * 7/2007 Jin et al. ........................ 382/154

FOREIGN PATENT DOCUMENTS

| KR | 10-0314502 B1 | 12/2001 |
| KR | 10-2006-0065800 A | 6/2006 |
| KR | 10-2006-0122666 A | 11/2006 |
| KR | 10-0681320 B1 | 2/2007 |

OTHER PUBLICATIONS

International Search Report, Application No. PCT/KR2010/004024, dated Feb. 23, 2011.
Written Opinion of the International Searching Authority, Application No. PCT/KR2010/004024, dated Feb. 23, 2011.
Fusiello, A., et al. "A compact algorithm for rectification of stereo pairs", Machine Vision and Applications (2000), vol. 16, pp. 16-22, Springer-Verlag.
Zhang, Z., et al., "A Flexible New Technique for Camera Calibration", IEEE Transactions on Pattern Analysis and Machine Intelligence, Nov. 2000, vol. 22, No. 11, pp. 1330-1334, IEEE.

* cited by examiner

*Primary Examiner* — Huy T Nguyen
(74) *Attorney, Agent, or Firm* — Kile Park Reed & Houtteman PLLC

(57) ABSTRACT

A calibration and rectification method includes arranging a monitor vertically relative to the optical axis of the stereo camera; displaying 3D patterns, similar to patterns obtained by projecting pattern images of various postures produced by a panel virtually located in front of the stereo camera, onto the monitor through a 3D graphical technique; and the stereo camera acquiring the 3D patterns displayed on the monitor to perform calibration and rectification, thereby correcting images of the stereo camera.

3 Claims, 6 Drawing Sheets

METHOD AND APPARATUS FOR HIGH-SPEED CALIBRATION AND RECTIFICATION OF A STEREO CAMERA

BACKGROUND OF THE INVENTION

1. Field of the Invention

The present invention relates to a camera calibration and rectification method and apparatus for a stereo camera, and more particularly, to a camera calibration and rectification method and apparatus for a stereo camera, which is capable of performing calibration and rectification at high speed.

2. Description of the Related Art

In general, the largest factor which causes a person to feel a three-dimensional (3D) effect is an effect of a spatial difference between left and right retinas, which occurs when the left and right eyes of the person see one object in different directions. A stereo camera using such an effect acquires different images through left and right lenses thereof, and displays a 3D image.

FIG. 1 shows a photograph of a stereo camera.

The stereo camera is implemented by using two left and right lenses and hardware for calculating 3D information. When a person sees an object through the eyes, the brain analyzes the object in 3D manners. In this ways, the stereo camera acquires left and right images of a space through the left and right lenses, and calculates 3D information of an object from the left and right images.

The stereo camera requires calibration and rectification to represent a 3D space.

Referring to FIG. 2, the calibration is to calibrate a distortion of the lenses and a tilt of an image sensor in the stereo camera. Referring to FIG. 3, the rectification is to precisely adjust a horizontal arrangement of the left and right lenses of the stereo camera.

The calibration is performed by the following process: a panel having cross stripes with a constant size is positioned at an arbitrary distance from the camera, and the camera acquires a plurality of pattern images based on various postures as shown in FIG. 2, and performs a calculation to extract calibration parameters from the acquired image information.

A camera calibration method which is currently used most frequently has been proposed by Zhengyou Zhang (refer to "A Flexible New Technique for Camera Calibration" (IEEE Trans, PAMI, Vol. 22, No. 11, November, 2000, pp. 1330-1334)).

Furthermore, the rectification is to acquire a rectification parameter using the calibration parameters of the left and right cameras.

FIG. 5 illustrate an imaged plane before and after rectification.

A left side of the FIG. 5 illustrates an imaged plane before rectification, and A right side of the FIG. 5 illustrates an imaged plane after rectification.

The rectification is performed to satisfy a condition where the optical axes of the left and right cameras of the stereo camera are parallel to each other as shown in FIG. 5, and to satisfy an epipolar constraint. A point W in the space is projected onto points M1 and M2 of left and right images. At this time, a plane represented by the points W, M1, and M2 is referred to as an epipolar plane, and a line segment at which the epipolar plane and an image plane meet each other is referred to as an epipolar line. The epipolar constraint is where a correspondence point to one point of a left side of the FIG. 5 exists on the epipolar line of a right side of the FIG. 5, and is a very important condition for the stereo camera.

A rectification method which is used most frequently has been proposed by Fusiello (refer to "A compact algorithm for rectification of stereo pairs" (Machine Vision and Applications, pp. 16-22, Vol. 12, 200.) by A. Fusiello, E. Trucco, A. Verri).

Referring to FIG. 3, before the rectification, a correspondence point to one point of the left image of FIG. 3 does not appear on an epipolar line (red horizontal line) of the right image. After the rectification, however, a correspondence point to one point of the left picture exists on the epipolar line of the right image.

FIG. 4 shows a panel disposed in various postures to acquire pattern images.

Referring to FIG. 4, the pattern images are acquired by tilting the panel having predetermined patterns displayed thereon in various directions in front of the camera, and the patterns may include check patterns with a constant distance therebetween, like a chessboard. During this process, the panel may be moved to acquire an image, and then postured in different positions and directions to acquire images.

Such a process has been manually performed, and dozens of minutes are required for acquiring the final calibration parameters.

When a stereo camera is manufactured, the camera calibration and rectification process requires the largest amount of time, and may become the largest factor which reduces productivity in mass production.

FIG. 6 is a flow chart showing a conventional calibration and rectification method for a stereo camera.

At step S610, a panel having grid patterns displayed thereon is prepared.

At step S620, a plurality of images of the panel are manually acquired from the left and right cameras as shown in FIG. 4.

At step S630, calibration for the left and right cameras is performed to acquire calibration parameters.

At step S640, a rectification parameter is acquired from the calibration parameters of the left and right cameras.

At step S650, the calibration and rectification parameters are applied to the stereo camera.

At step S660, an image to which the calibration and rectification parameters are applied is checked.

In the conventional calibration and rectification method, the pattern images in various postures are acquired by manually tilting the panel at an arbitrary angle in front of the camera at the step S620, and the calibration and rectification parameters are then calculated. Accordingly, since the manual operation requires a long time, the time required for the calibration and rectification of the stereo camera inevitably increases.

SUMMARY OF THE INVENTION

Accordingly, the present invention has been made in an effort to solve the problems occurring in the related art, and an object of the present invention is to provide a high speed calibration and rectification method and apparatus for a stereo camera, which is capable of significantly reducing a time required for obtaining a pattern image for calibration and rectification of the stereo camera.

In order to achieve the above object, according to one aspect of the present invention, there is provided a calibration and rectification method for a stereo camera. The calibration and rectification method includes arranging a monitor vertically relative to the optical axis of the stereo camera; displaying 3D patterns, similar to patterns obtained by projecting pattern images of various postures produced by a panel virtually located in front of the stereo camera, onto the monitor through a 3D graphical technique; and acquiring, by the stereo camera, the 3D patterns displayed on the monitor to perform calibration and rectification, thereby correcting images of the stereo camera.

According to another aspect of the present invention, a calibration and rectification apparatus for a stereo camera includes: a stereo camera; a rail unit controlling movement of the stereo camera; a first monitor arranged vertically relative to the optical axis of the camera and displaying a 3D pattern at various angles and positions; a computer generating the 3D pattern through a 3D graphical technique, outputting the generated 3D pattern onto the first monitor, and calculating calibration and rectification parameters of the stereo camera; and a second monitor for checking calibration and rectification results.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
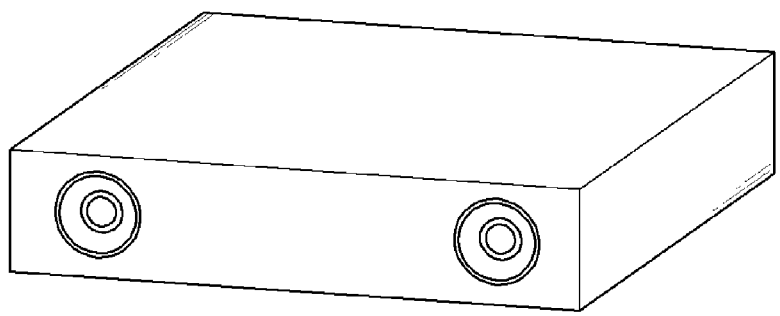
FIG. 1 shows a photograph of a stereo camera.
Figure 2:
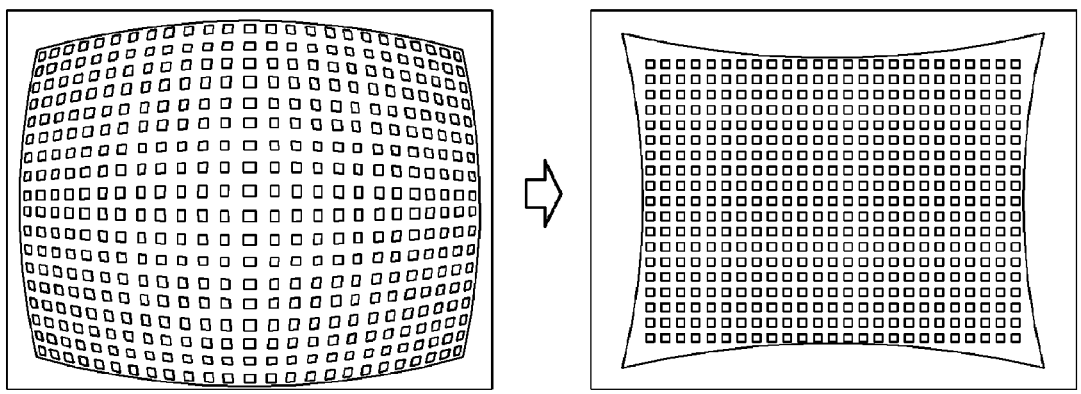
FIG. 2 shows an image before and after calibration.
Figure 3:
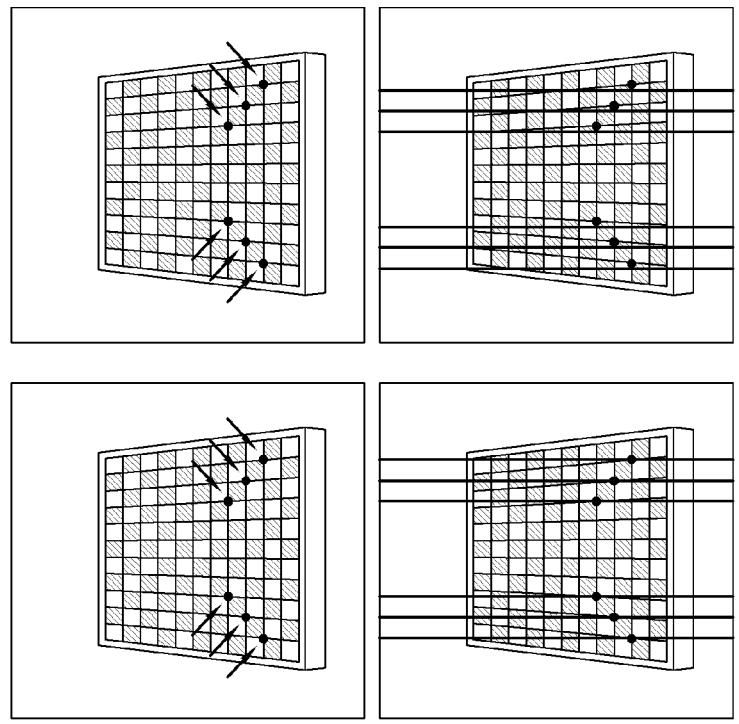
FIG. 3 shows an image before and after rectification.
Figure 4:
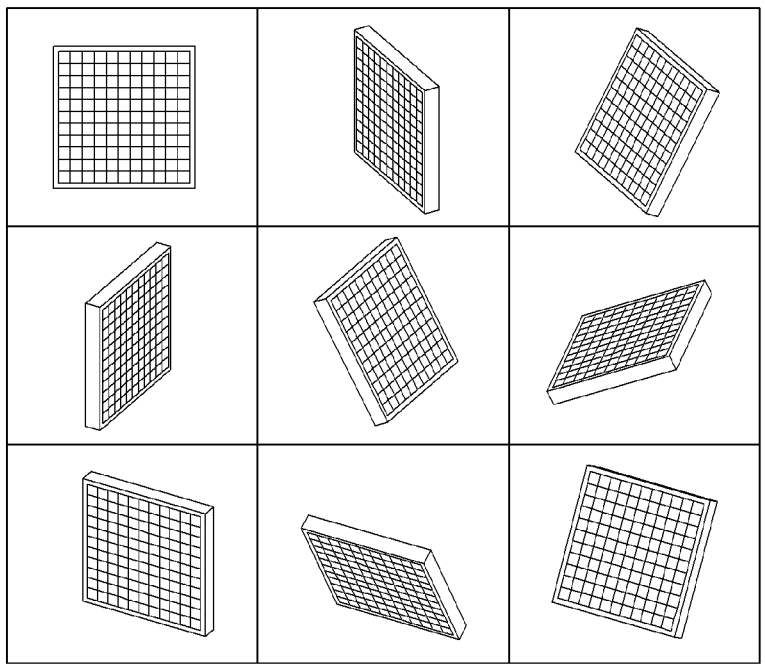
FIG. 4 shows a panel in various postures to obtain pattern images.
Figure 5:
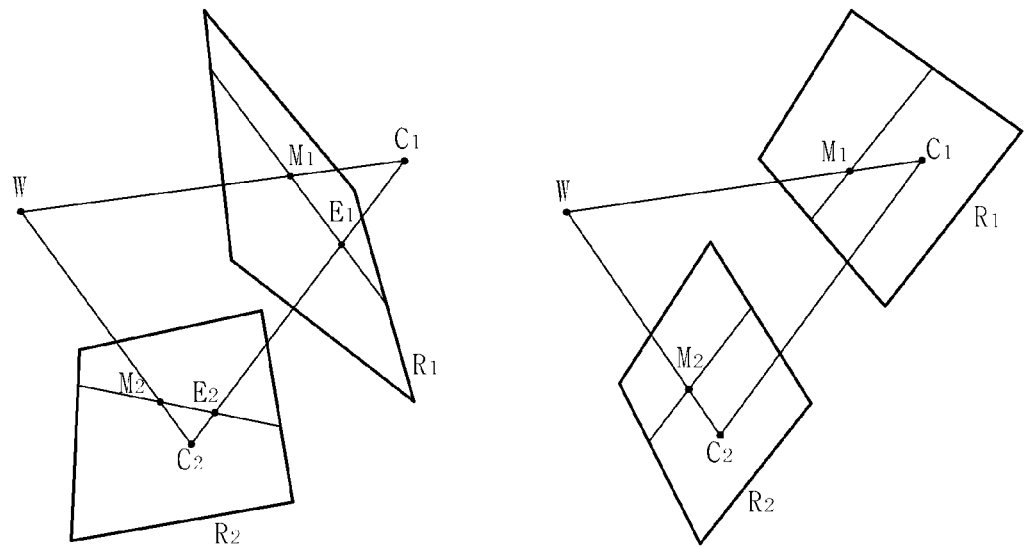
FIG. 5 illustrates an image before and after rectification.
Figure 6:
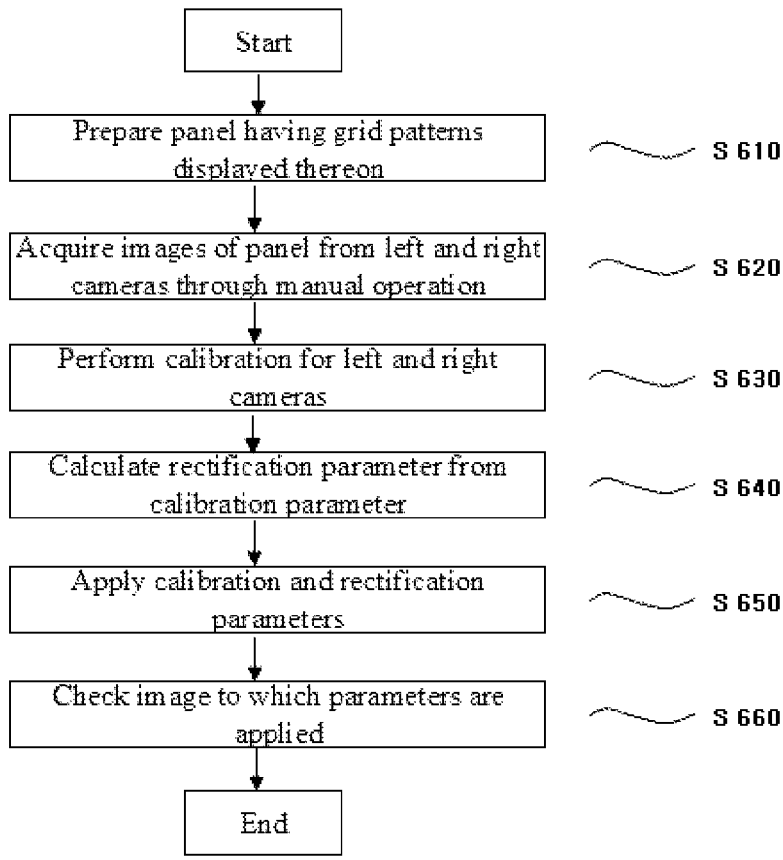
FIG. 6 is a flow chart showing a conventional calibration and rectification method for a stereo camera.

Reference will now be made in greater detail to a preferred embodiment of the invention, an example of which is illustrated in the accompanying drawings. Wherever possible, the same reference numerals will be used throughout the drawings and the description to refer to the same or like parts.

In the conventional calibration and rectification method for a stereo camera, a person should carry a grid-pattern panel and take a posture to acquire a 3D image. In the embodiment of the present invention, however, a 3D graphical technique is used to acquire a 3D image within a short time. Therefore, the calibration and rectification may be performed at high speed.

Figure 7:
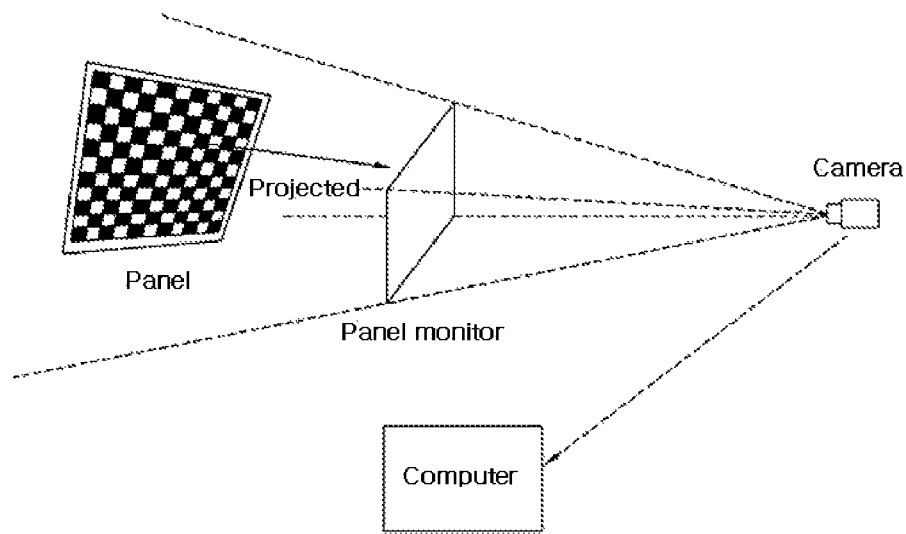
FIG. 7 is a diagram explaining a concept for implementing a high speed calibration and rectification method for a stereo camera according to an embodiment of the present invention.

FIG. 7 is a diagram explaining a concept for implementing a high speed calibration and rectification method for a stereo camera according to an embodiment of the present invention.

The camera is arranged at a predetermined position, and it is assumed that an arbitrary plane perpendicular to the optical axis of the camera is set in front of the camera. In FIG. 7, the plane is illustrated as a plane monitor. When the content of the panel positioned in front of the plane monitor is projected toward the camera, the patterns of the panel may seem to be projected onto the plane monitor. From the position of the camera, there is no difference between when the camera directly acquires an image from the patterns of the panel existing in front of the camera and when the camera acquires an image from the content projected onto the plane monitor. Therefore, when the plane monitor is replaced with a large monitor and virtual patterns are generated by a 3D graphical technique, the camera may acquire the same pattern image as in the existing method. In the conventional calibration and rectification method, 3D patterns are acquired while the position of the panel is manually changed. In the embodiment of the present invention, however, 3D patterns in various postures are generated by a 3D graphical technique and displayed on the plane monitor, thereby performing the calibration and rectification within a short time.

Figure 8:
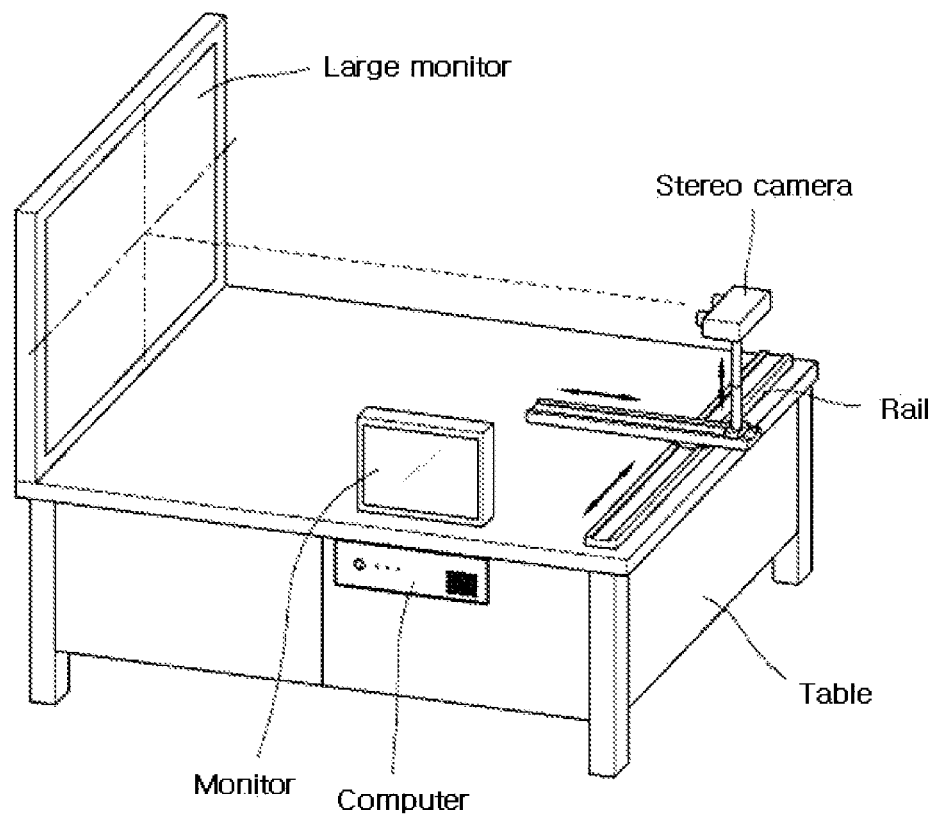
FIG. 8 illustrates a high speed calibration and rectification apparatus for a stereo camera according to an embodiment of the present invention.

FIG. 8 illustrates a high speed calibration and rectification apparatus for a stereo camera according to an embodiment of the present invention.

Referring to FIG. 8, the calibration and rectification apparatus for a stereo camera includes a table for installing the stereo camera, a rail unit for freely moving the stereo camera in X, Y, and Z-axis directions, a large monitor arranged perpendicular to the optical axis of the camera, a computer for generating and outputting 3D patterns onto the large monitor, and another monitor for controlling the current content of the computer and checking the control result.

Figure 9:
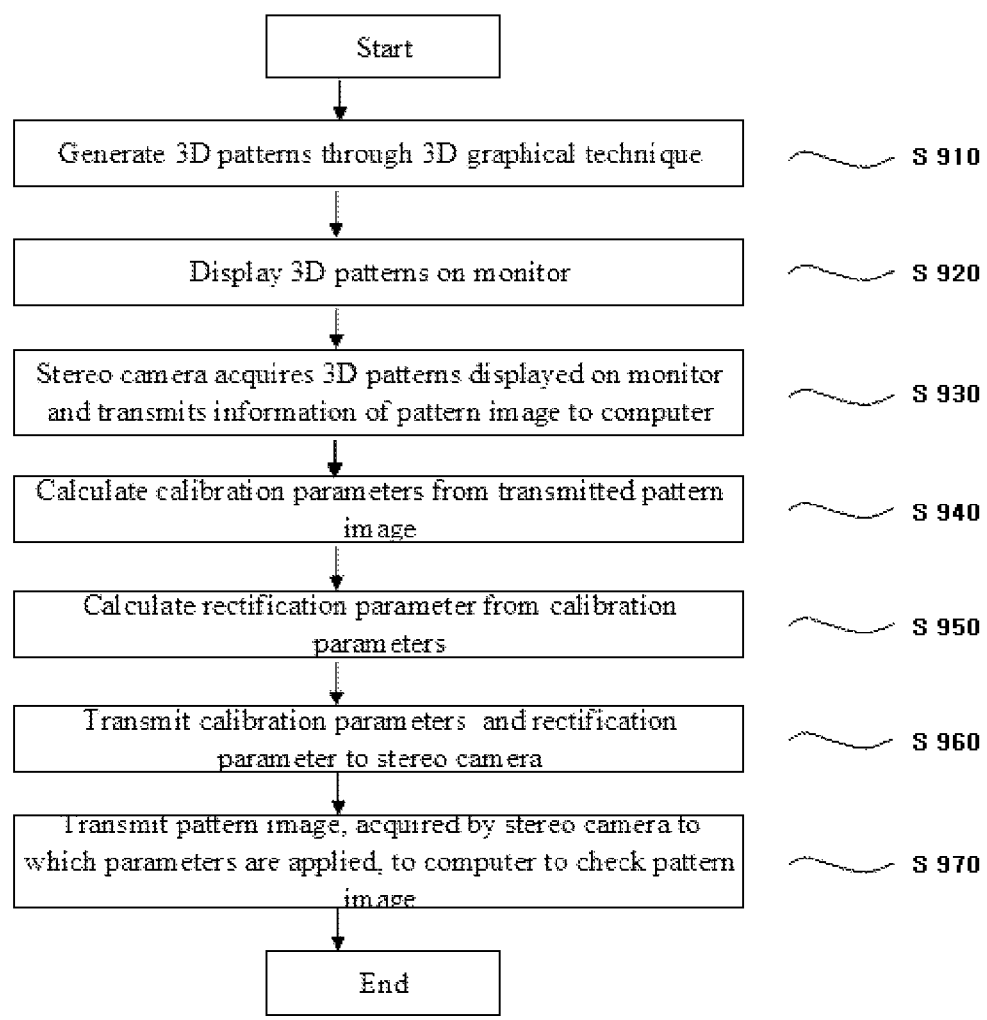
FIG. 9 is a flow chart showing a high speed calibration and rectification method for a stereo camera according to the embodiment of the present invention.

FIG. 9 is a flow chart showing a calibration and rectification method for a stereo camera according to the embodiment of the present invention.

At step S910, 3D patterns, similar to those obtained by projecting pattern images in various postures produced by a panel virtually located in front of the stereo camera onto a monitor, are generated by a 3D graphical technique.

When a 3D graphics library such as OpenGL (Open Graphics Library) is used, virtual pattern images may be generated on the large monitor existing at a predetermined distance from the camera, thereby obtaining the same effect as patterns are projected onto the large monitor.

At step S920, the 3D patterns are displayed on the large monitor.

After the large monitor is installed at a predetermined distance from the camera in a direction perpendicular to the optical axis of the camera, the computer outputs pattern images of 3D patterns, which virtually exist in the space, onto the large monitor based on the center point of the camera.

At step S930, the stereo camera acquires the pattern images from the large monitor, and transmits the pattern images to the computer. The camera takes the patterns projected onto the monitor, and the pattern images acquired by the camera are transmitted to the computer.

At step S940, the computer calculates calibration parameters for left and right cameras of the stereo camera from the received pattern images. The plurality of acquired pattern images are used to calculate the calibration parameters.

Here, the calibration parameters are calculated by the pattern images acquired from the left and right lenses of the stereo camera, respectively.

At step S950, the calibration parameters are used to calculate a rectification parameter.

At step S960, the calibration parameters and the rectification parameter are transmitted to the stereo camera.

At step S970, the pattern images acquired by the stereo camera to which the parameters are applied are transmitted to the computer to check the pattern images. Then, the high speed calibration and rectification method for the stereo camera is ended. The calculated parameters are transmitted to the stereo camera to check whether the input images were corrected or not.

As such, the calibration and rectification method according to the embodiment of the present invention may perform calibration and rectification at a much higher speed than the process in which images for calibration are obtained while a person carries and moves a panel. Furthermore, since the calculated parameters are immediately transmitted to the camera, the calibration and rectification result may be immediately checked, which makes it possible to increase the productivity of the stereo camera.

Figure 10:
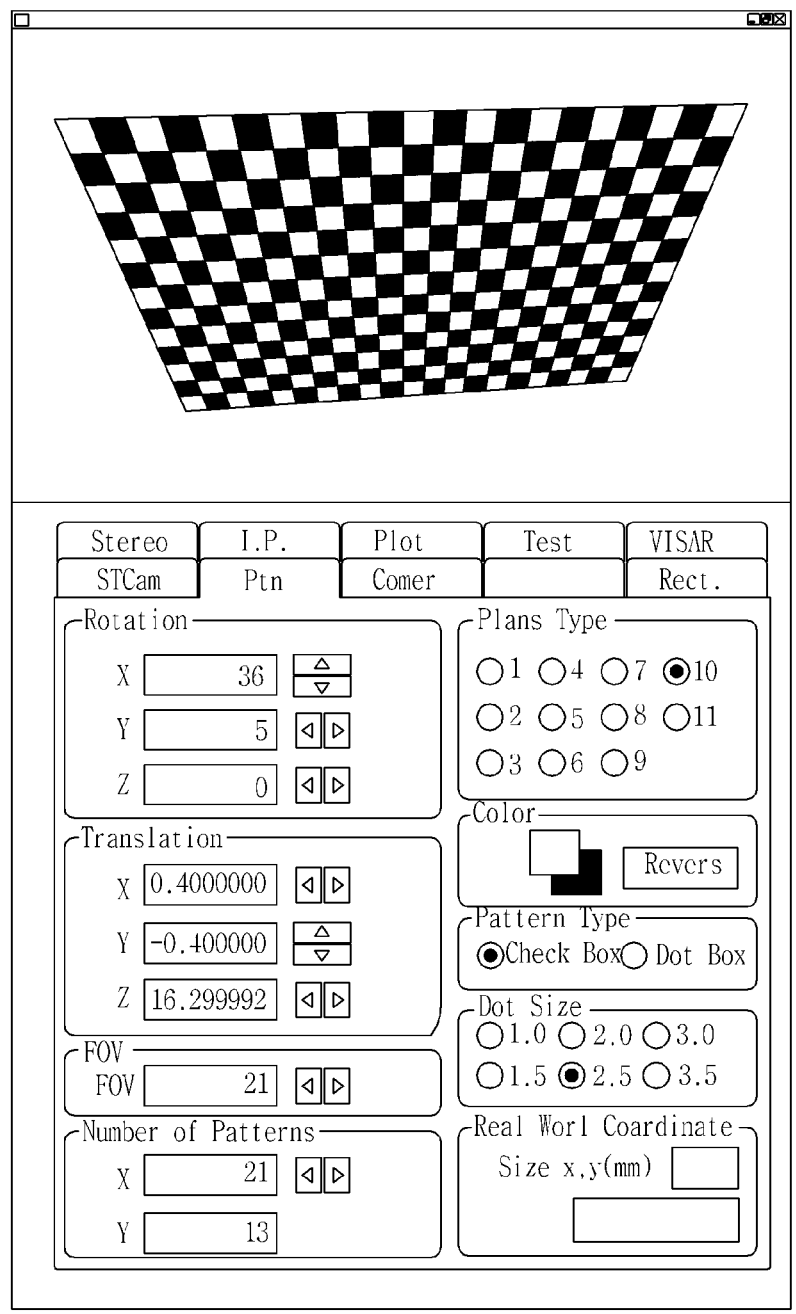
FIG. 10 shows an example in which a 3D pattern are projected onto the large monitor and an example of a control window of the computer.

FIG. 10 shows an example in which a 3D pattern are projected onto the large monitor and an example of a control window of the computer.

An upper side of the FIG. 10 shows a 3D pattern displayed on the large monitor by the 3D graphical technique. An lower side of the FIG. 10 shows an example of a control window for controlling the rotation degree and position of the pattern displayed by the 3D graphical technique. As shown in FIG. 10, the 3D pattern may be formed within a short time by controlling a rotational angle (X, Y, or Z axis), a position (X, Y, and Z), the number of patterns, and the shape of a pattern through the computer.

According to the embodiments of the present invention, the high speed calibration and rectification method for a stereo camera may significantly reduce the time required for the calibration and rectification through the 3D graphical technique, compared with the conventional method in which a person carries a panel to obtain a 3D image.

Furthermore, as the time required for acquiring a pattern image is reduced, it is possible to increase the productivity of the stereo camera. That is, when the stereo camera is manufactured according to the conventional method, dozens of minutes per one camera may be required for completing a product by applying parameters obtained by a manual operation. However, the high speed calibration and rectification method according to the embodiment of the present invention may generate and apply parameters within dozens of seconds per one stereo camera. Therefore, it is possible to increase the productivity. Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A calibration and rectification method for a stereo camera, wherein a monitor is arranged vertically relative to the optical axis of the stereo camera, 3D patterns, similar to patterns obtained by projecting pattern images of various postures produced by a panel virtually located in front of the stereo camera, are displayed onto the monitor through a 3D graphical technique, and the stereo camera acquires the 3D patterns displayed on the monitor to perform calibration and rectification, thereby correcting images of the stereo camera, wherein the calibration and rectification method comprises;

generating the 3D patterns through the 3D graphical technique;

displaying the 3D patterns onto the monitor;

acquiring, by the stereo camera, the 3D patterns displayed on the monitor, and transmitting information of the 3D pattern images to a computer;

calculating calibration parameters from the transmitted pattern images;

calculating a rectification parameter using the calibration parameters;

transmitting the calibration parameters and the rectification parameter to the stereo camera; and transmitting pattern images, acquired by the stereo camera to which the calibration parameters and the rectification parameter are applied, to the computer to check the pattern images.

2. The calibration and rectification method of claim 1, wherein, in the calculating of the calibration parameters,
the calibration parameters are calculated for pattern images acquired from the left and right lenses of the stereo camera, respectively.

3. A calibration and rectification apparatus for a stereo camera, comprising:

a stereo camera;

a rail unit controlling movement of the stereo camera;

a first monitor arranged vertically relative to the optical axis of the camera and displaying a 3D pattern at various angles and positions;

a computer generating the 3D pattern through a 3D graphical technique, outputting the generated 3D pattern onto the first monitor, and calculating calibration and rectification parameters of the stereo camera; and a second monitor for checking calibration and rectification results, wherein the calibration and rectification parameters are transmitted to the stereo camera; pattern images are acquired by the stereo camera; and the pattern images are transmitted to the computer to check the pattern images.

* * * * *